United States Patent [19]
Bishop

[11] 4,160,621
[45] Jul. 10, 1979

[54] TOTAL HYDRAULIC SILAGE WAGON

[76] Inventor: Raymond Bishop, Rte. 4, Lawrenceburg, Tenn. 38464

[21] Appl. No.: 848,500

[22] Filed: Nov. 4, 1977

[51] Int. Cl.² ............................................. B60P 1/38
[52] U.S. Cl. .................................. 414/786; 414/528; 37/142.5
[58] Field of Search ................. 214/83.36, 83.34, 519, 214/82, 83, 83.22; 37/142.5

[56] References Cited
U.S. PATENT DOCUMENTS

| | | | |
|---|---|---|---|
| 2,477,707 | 8/1949 | Walz | 214/83.34 |
| 2,729,346 | 1/1956 | German | 214/82 X |
| 2,788,927 | 4/1957 | Hoffstetter | 214/83.36 X |
| 2,805,784 | 9/1957 | Dokken | 214/83.36 |
| 2,868,398 | 1/1959 | Anderson et al. | 214/82 |

*Primary Examiner*—Albert J. Makay
*Attorney, Agent, or Firm*—Abe Hatcher

[57] ABSTRACT

A discharge gate for silage wagon operated by at least one cylinder supplied with hydraulic fluid pumped from a pulling tractor's hydraulic remote outlet, the same outlet also supplying hydraulic fluid to an hydraulic motor which operates an endless chain-type floor-positioned silage discharge mechanism. The gate is preferably a front gate so that the silage is spread by the wagon axles in a substantially level manner in a trench or pit silo as the wagon passes thereover after discharging the silage through the open gate.

1 Claim, 4 Drawing Figures

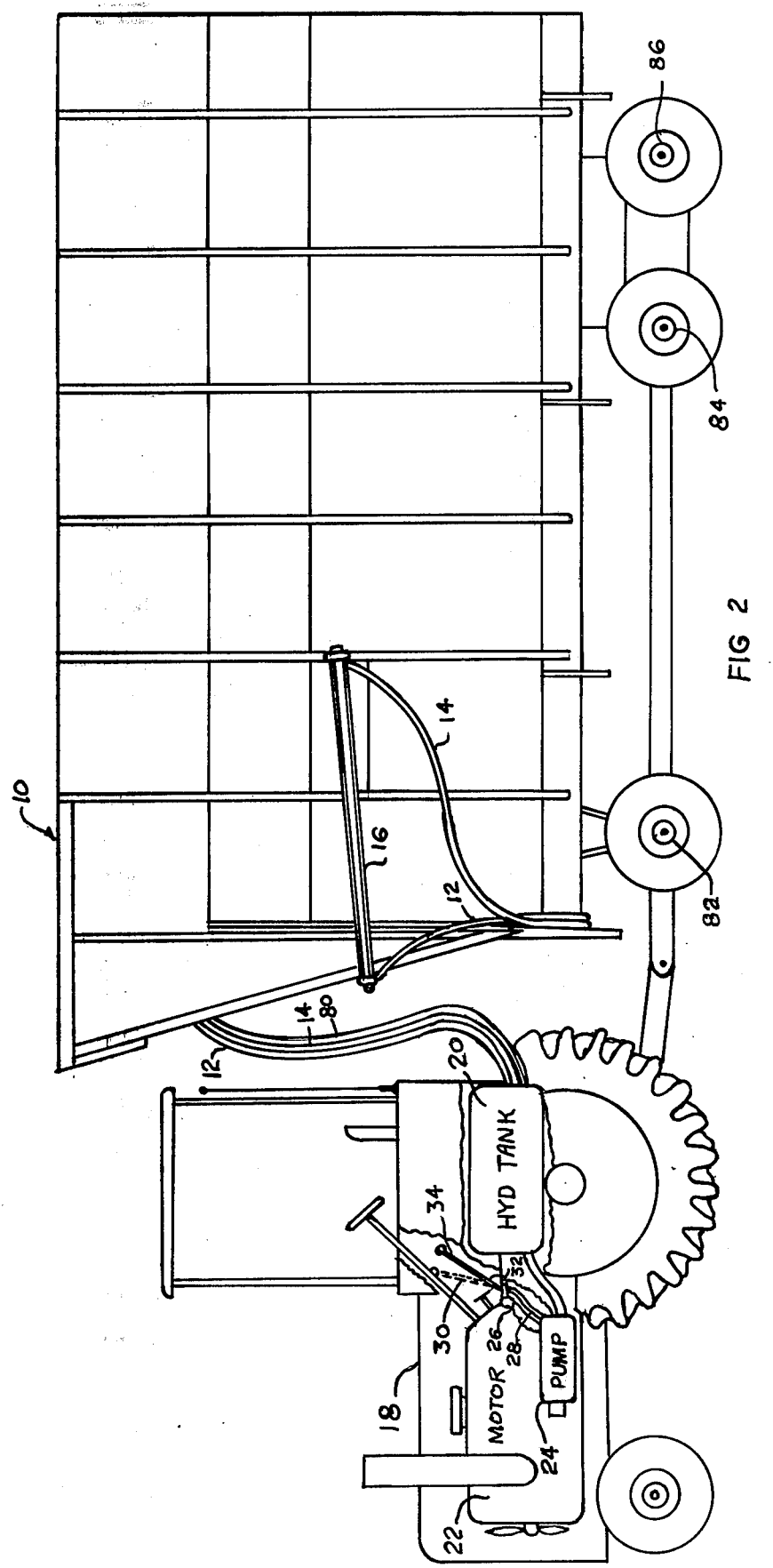

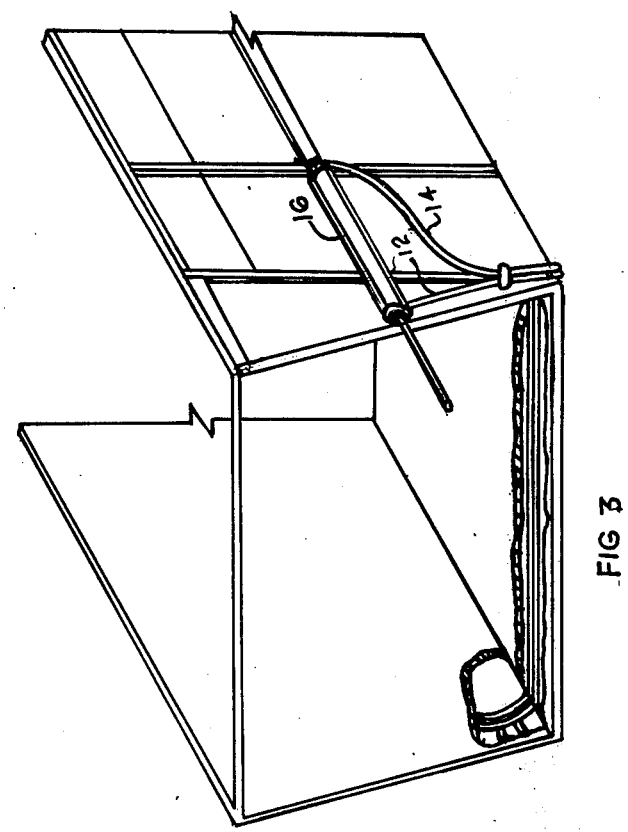

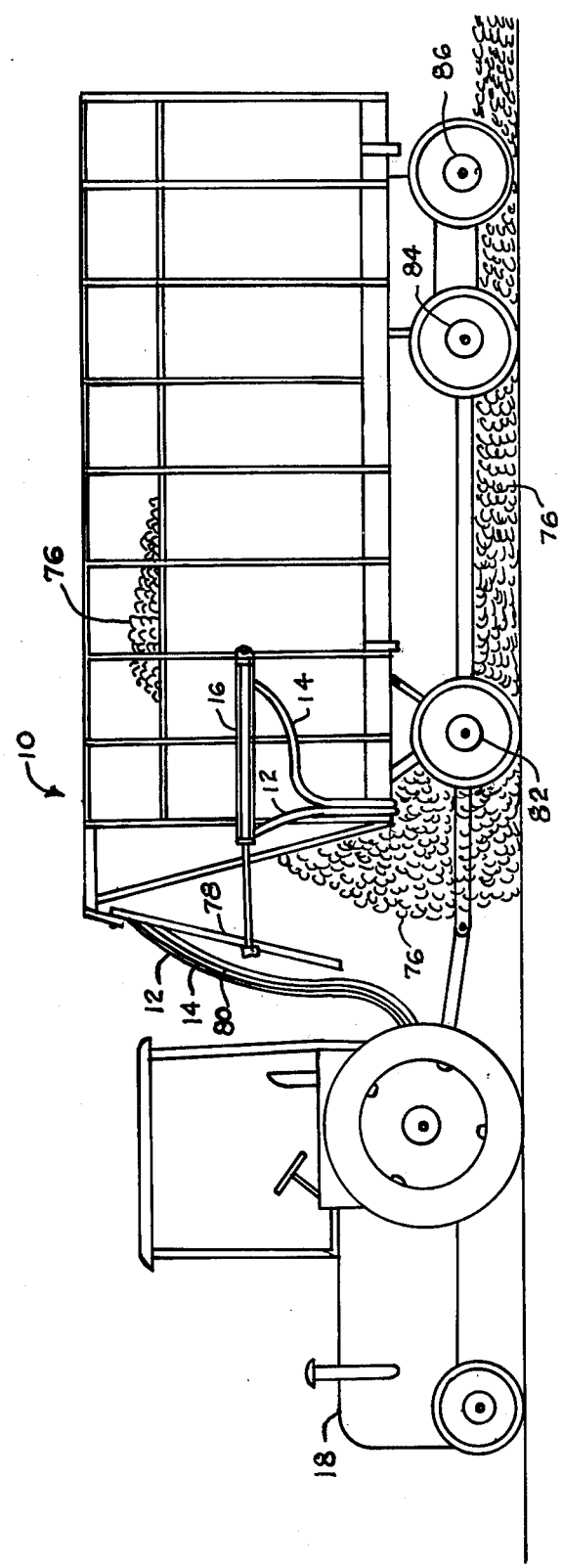

TOTAL HYDRAULIC SILAGE WAGON

BACKGROUND OF THE INVENTION

1. Field of the Invention

This invention relates to farm machinery or implements. More particularly, it relates to an hydraulic cylinder-operated gate for discharging silage from a wagon and levelling it in a pit or trench silo.

2. Description of the Prior Art

Levelling silage in trench or pit silos such as those dug into a hillside so that a tractor driver can pull a wagon thereinto and unload his silage therefrom and level it in a continuous manner presents a problem. Moeller, in U.S. Pat. No. 3,771,673, teaches how to unload silage but not how to level it. For example, Moeller uses one-way hydraulic cylinders to operate a rear or tail gate to unload fodder such as corn stalks. Also, Regier, in U.S. Pat. No. 2,774,494, teaches use of a conveyor or web operated by an electric motor or tractor power take-off (PTO) or lift for unloading grain or forage at a silo grain elevator.

SUMMARY OF THE INVENTION

As a marked improvement over the unloading devices of the aforesaid patents, after extended investigation I have devised a silage dispensing gate, preferably in association with an endless chain-type conveyor, operated by hydraulic fluid being pumped by a pulling tractor from its hydraulic remote outlets, which may be the same tank pump unit that supplies transmission fluid, to at least one two-way cylinder which opens and closes a wagon gate. The same tractor tank also supplies hydraulic fluid to an hydraulic motor which operates the preferred conveyor.

When the tractor driver pulls a lever, for example, within reach of where he is sitting on the tractor seat or in the tractor cab or enclosure, hydraulic fluid is pumped through fluid lines to the double-acting cylinder, preferably two cylinders, one for each side of the gate, the pistons of which move in one way to lift the gate, preferably located in the front wall position of the wagon, and in another to close it. When the opening begins, and the gate moves forward to an open (raised or lifted) position, substantially simultaneously gears, preferably inside a gearbox, and operated by the hydraulic motor (preferably placed in the vicinity of the preferred conveyor), begin turning the endless chain-type conveyor located in the bottom of the wagon. According to a preferred embodiment, the main hydraulic lines, which comprise two, one for opening and the other for closing the gate, lead to the cylinder on the side of the wagon opposite the one on which the hydraulic motor is positioned. These lines are tapped into, for example, by T-joints, to bring hydraulic fluid to the cylinder on the near side and also to the hydraulic motor, as will be clearer from the description of the drawing hereinafter. The silage moves forward and falls off into the trench through which the wagon is moving, being levelled first by the front and then by the rear axles of the wagon as they move over it. When the driver wishes to close the gate, he simply pushes the lever to a "close gate" position to cause the hydraulic fluid to flow through the second of the two lines to the hydraulic cylinders and to the hydraulic motor, thereby stopping movement of the conveyor and returning the gate to the closed position. No special latching mechanism is used. A third hydraulic fluid line is preferably provided for overflow to the tractor hydraulic fluid tank and pumping unit and lubrication of the hydraulic motor. However, for some types of motors, only two lines are necessary.

Thus, according to the preferred embodiment of my invention, a pair of hydraulically operated two-way or double-acting pistons such as the one shown in U.S. Pat. No. 3,896,947 for pushing and pulling the rejection gate of a trailer for highway transport of loads of dirt, rock, ore and like bulk material, according to my invention preferably one for each side, raises and lowers my gate upon command by the tractor driver, either by pushing a button, for example, or more preferred, as explained hereinabove, operating a hand lever suitably connected to the hydraulic fluid tank and pump unit and engine of the tractor. At the same time and by the same command the hydraulic motor, supplied by hydraulic fluid from the same tank and pump unit, turns the associated gears to move, preferably by chain, an endless belt-type conveyor. The conveyor has shafts and sprocket at front and rear and is preferably divided into two halves, each made up of a plurality of slats or sections, as will be better understood by reference to the drawing which is described hereinafter.

DESCRIPTION OF THE DRAWING AND OF A PREFERRED EMBODIMENT

For a better understanding of my invention, reference will now be made to the drawing, which represents a preferred embodiment of the invention.

In the drawing,

FIG. 2 is a view from one side of a tractor pulling a silage wagon having an unloading gate and a conveyor such as those of the invention.

FIG. 3 is a view from outside a wagon of an unloading gate such as that of the invention showing how the hydraulic fluid lines cross from one side to the other side of the wagon.

FIG. 4 shows levelling of silage by axles of a wagon having a gate according to the invention.

Figure 1:
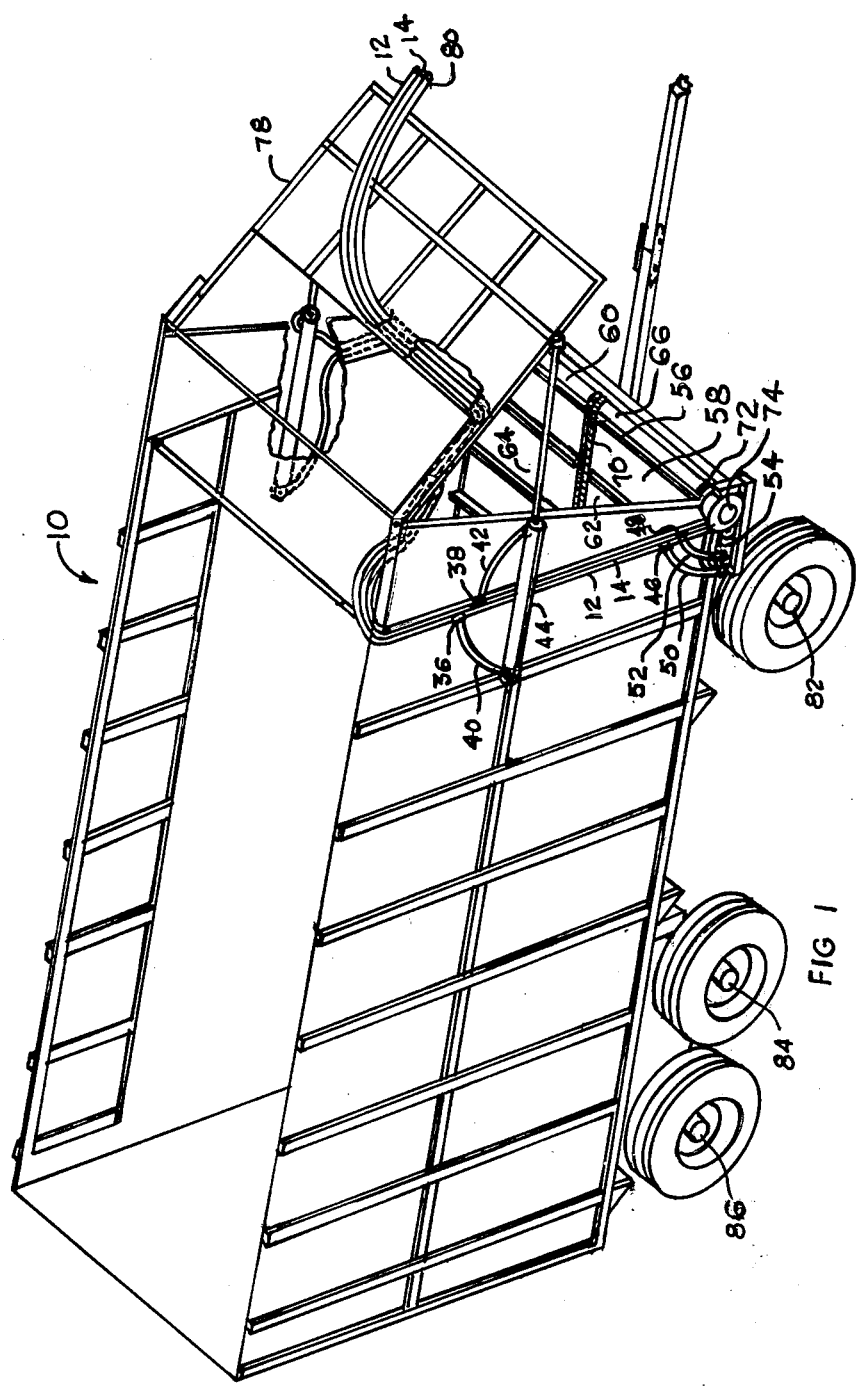
FIG. 1 is a prespective view from one side, broken away in part to show details, of a wagon having an unloading gate and conveyor according to the invention.

Looking now to the drawing, the hydraulically operated gate and conveyor combination of the invention is depicted generally as 10. Double-action hydraulic fluid lines 12 and 14 lead to piston 16 from tractor 18 hydraulic fluid supply system comprising tank 20, engine 22 and pump 24 operated via lines 26 and 28 from open 30 and shut 32 positions of lever 34. Tapped into lines 12 and 14 at T joints 36 and 38 are lines 40 and 42, which lead to piston 44 on the near side of the wagon. Also tapped into lines 12 and 14, at T joints 46 and 48 are lines 50 and 52, which lead to hydraulic motor 54.

Conveyor 56 is made up of two longitudinal endless belt-type rotating halves 58 and 60 divided into a plurality of sections 62 and 64 for each half which turn around front cylindrical roller 66 and a similarly positioned roller (not shown) located at the rear of the wagon. Conveyor 56 is operated by chains 70 turned by gears 72 in gearbox 74, which is powered by hydraulic motor 54. When a driver adjusts lever 34 to the starting or unloading position 30, sections 62 and 64 of halves 58 and 60 of conveyor 56 begin moving to unload silage 76 as front gate 78 is opened. Silage 76 is levelled as axle 82, and later the rear axles 84 and 86, of the wagon move over it. Moving lever 34 to the reverse or "stop"

position 32 closes front gate 78 and stops the simultaneous turning of conveyor 56. A third hydraulic fluid line 80 is for overflow of hydraulic fluid and lubrication of motor 54.

While the invention has been described in terms of preferred embodiments, the claims appended hereto are intended to encompass all embodiments which fall within the spirit of the invention.

Having thus described my invention and certain preferred embodiments thereof, I claim:

1. A process for unloading silage which comprises setting a lever on a tractor so as to pump hydraulic fluid from an hydraulic fluid tank on said tractor to a pair of hydraulic cylinders, one located on each side of a top-hinged front gate of a wagon being pulled by said tractor, thereby opening said gate, and, substantially at the same time, by pumping hydraulic fluid from the same hydraulic tank, starting an hydraulic motor located on the wagon in juxtaposition with gears to cause said gears to turn an endless chain-type conveyor in the bottom of the wagon and thereby discharge silage from the wagon into a trench silo as said tractor moves therethrough, levelling the silage with axles of the wagon as they move over it, and, after discharging silage, resetting the lever so as to cause the hydraulic fluid to reverse cylinder action and close said door and at substantially the same time cause the motor to stop turning of the conveyor.

* * * * *